US012669746B1

(12) United States Patent
Pang et al.

(10) Patent No.: US 12,669,746 B1
(45) Date of Patent: Jun. 30, 2026

(54) HYBRID LENS SYSTEM FOR PROJECTORS

(71) Applicant: Amazon Technologies, Inc., Seattle, WA (US)

(72) Inventors: Wubin Pang, San Jose, CA (US); John Michael Cesaaratto, Campbell, CA (US); Anthony Botzas, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 18/616,806

(22) Filed: Mar. 26, 2024

(51) Int. Cl.
| | |
|---|---|
| *G03B 21/20* | (2006.01) |
| *G02B 13/00* | (2006.01) |
| *G03B 17/54* | (2021.01) |
| *G03B 21/00* | (2006.01) |
| *G03B 21/53* | (2006.01) |

(52) U.S. Cl.
CPC ....... *G03B 21/208* (2013.01); *G02B 13/0045* (2013.01); *G02B 13/009* (2013.01); *G03B 17/54* (2013.01); *G03B 21/008* (2013.01); *G03B 21/53* (2013.01)

(58) Field of Classification Search
CPC .. G02B 13/0045; G02B 13/009; G03B 17/54; G03B 21/008; G03B 21/208; G03B 21/53
See application file for complete search history.

(56) References Cited

U.S. PATENT DOCUMENTS

| | | | | |
|---|---|---|---|---|
| 6,652,104 B2 * | 11/2003 | Nishida | ................ | H04N 9/3185 |
| | | | | 353/69 |
| 6,877,863 B2 * | 4/2005 | Wood | ................... | H04N 9/3185 |
| | | | | 353/42 |
| 7,070,283 B2 * | 7/2006 | Akutsu | .................... | H04N 5/74 |
| | | | | 353/30 |
| 7,182,466 B2 * | 2/2007 | Sunaga | .................... | H04N 5/74 |
| | | | | 353/69 |
| 7,270,421 B2 * | 9/2007 | Shinozaki | ............ | G03B 21/142 |
| | | | | 353/121 |
| 7,359,575 B2 * | 4/2008 | Bassi | ........................ | G06T 3/18 |
| | | | | 345/427 |
| 7,441,906 B1 * | 10/2008 | Wang | ..................... | G03B 21/14 |
| | | | | 353/121 |
| 7,446,954 B2 * | 11/2008 | Sun | ........................ | G02B 13/18 |
| | | | | 359/569 |
| 7,782,387 B2 * | 8/2010 | Azuma | ................ | H04N 23/698 |
| | | | | 359/662 |
| 11,287,732 B2 * | 3/2022 | Tian | ................... | G02B 17/0856 |
| 2002/0051095 A1 * | 5/2002 | Su | ........................ | H04N 9/3194 |
| | | | | 348/745 |
| 2002/0122161 A1 * | 9/2002 | Nishida | ................ | H04N 9/3194 |
| | | | | 353/70 |

(Continued)

*Primary Examiner* — Michael B. Pierorazio
(74) *Attorney, Agent, or Firm* — Eversheds Sutherland (US) LLP

(57) ABSTRACT
A lens system includes an aperture stop, a first lens disposed on a first side of the aperture stop, a second lens disposed on the first side of the aperture stop, a third lens disposed on a second side of the aperture stop, and a fourth lens. The first lens is manufactured from glass. The second lens, the third lens, and the fourth lens are manufactured from thermoplastic. The fourth lens includes a first surface oriented towards the aperture stop and a second surface oriented away from the aperture stop. The first surface is refractive and diffractive to light passing through the lens system.

20 Claims, 4 Drawing Sheets

(56) References Cited

U.S. PATENT DOCUMENTS

| | | | | |
|---|---|---|---|---|
| 2003/0210381 A1* | 11/2003 | Itaki | | H04N 5/74 353/70 |
| 2004/0156024 A1* | 8/2004 | Matsuda | | H04N 9/3185 353/70 |
| 2005/0046803 A1* | 3/2005 | Akutsu | | H04N 5/74 353/69 |
| 2005/0073661 A1* | 4/2005 | Tamura | | H04N 9/3194 353/70 |
| 2005/0151934 A1* | 7/2005 | Akutsu | | G03B 21/147 353/69 |
| 2005/0237492 A1* | 10/2005 | Shinozaki | | H04N 9/3185 353/69 |
| 2006/0098167 A1* | 5/2006 | Sato | | G03B 21/26 353/35 |
| 2006/0203207 A1* | 9/2006 | Ikeda | | H04N 9/3185 353/70 |
| 2007/0008344 A1* | 1/2007 | Medina | | G06T 15/10 345/647 |
| 2007/0257941 A1* | 11/2007 | Plut | | G06F 9/451 345/660 |
| 2007/0285626 A1* | 12/2007 | Miyasaka | | G03B 21/206 353/85 |
| 2009/0262311 A1* | 10/2009 | Lin | | G02B 17/045 353/81 |
| 2009/0278999 A1* | 11/2009 | Ofune | | H04N 21/47 348/E3.048 |
| 2010/0002123 A1* | 1/2010 | Nozaki | | G03B 17/54 348/E5.022 |
| 2010/0045942 A1* | 2/2010 | Furui | | H04N 9/3194 353/69 |
| 2011/0210979 A1* | 9/2011 | Furui | | G03B 37/04 345/619 |
| 2011/0234994 A1* | 9/2011 | Uchiyama | | H04N 9/3185 353/121 |
| 2011/0285971 A1* | 11/2011 | Oka | | H04N 9/3185 353/70 |
| 2011/0292351 A1* | 12/2011 | Ishii | | H04N 9/3185 353/69 |
| 2013/0033683 A1* | 2/2013 | Hsu | | G03B 21/008 362/231 |
| 2019/0121093 A1* | 4/2019 | Gong | | G03B 21/147 |
| 2022/0050366 A1* | 2/2022 | Huang | | G03B 21/008 |

* cited by examiner

HYBRID LENS SYSTEM FOR PROJECTORS

BACKGROUND

Projectors have become increasingly popular due to their dynamic screen size, eye comfort, small form factors, portability, and the like. Projectors work by projecting an image onto a surface, usually a projection screen. Lenses are used to project the images for viewing, for example, through magnification. In some examples, motors are used to move the lenses in order to focus the image on the projection screen and/or change a size of the image on the projection screen. However, current lenses are often bulky, expensive, and require a large driving force from the motors.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
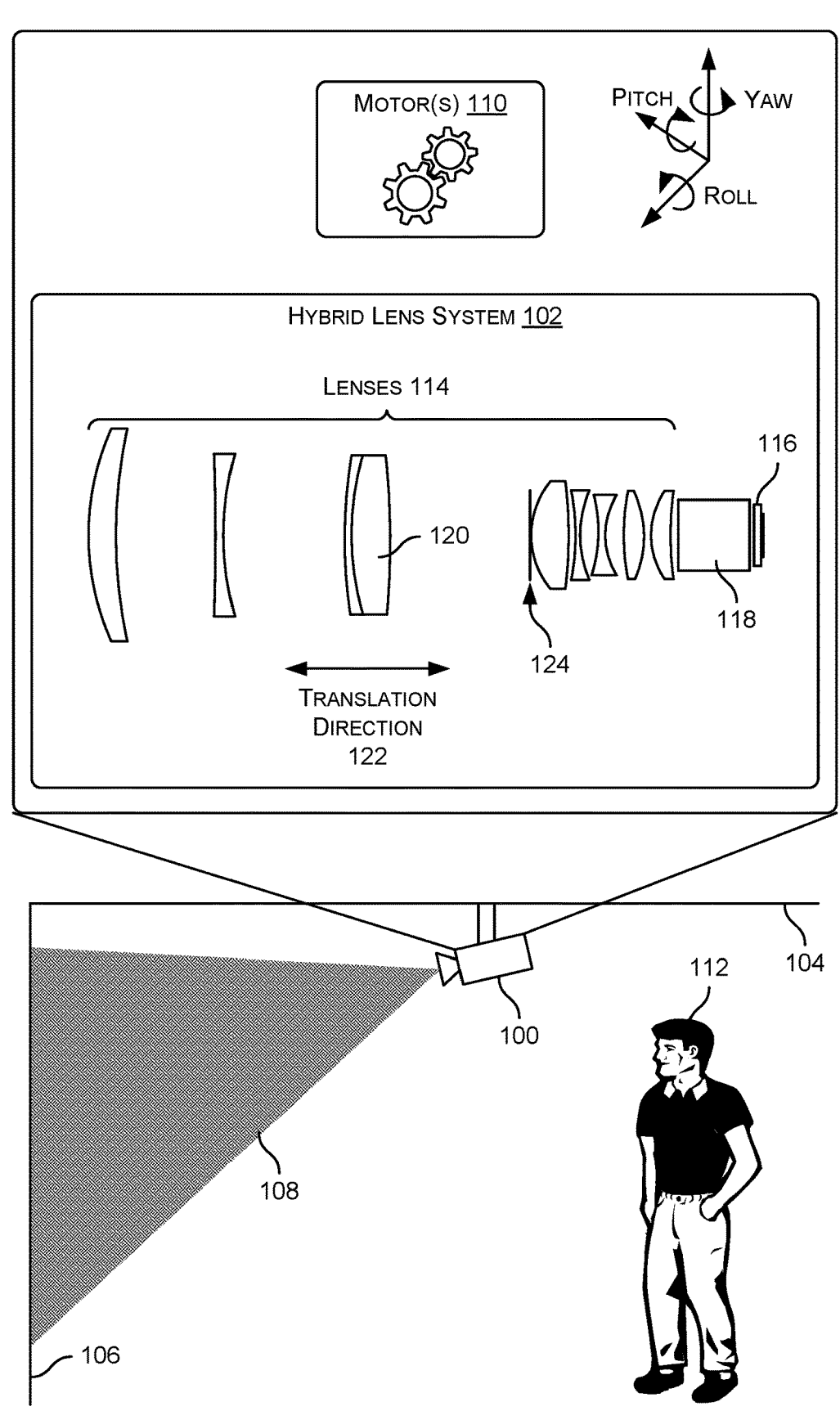
FIG. 1 illustrates an example environment including an example projector with a hybrid lens system, according to examples of the present disclosure.

This application is directed, at least in part, to a hybrid lens system that includes thermoplastic lens elements and glass lens elements, according to examples of the present disclosure. In some instances, the hybrid lens system may find use within a projector. The use of thermoplastic lens elements within the projector, or the lens system, may reduce a weight of conventional lens systems. Reducing a weight of the lens elements may lead to increased performance and user experiences, as well as reduced wear on motors that are used to drive the lenses. For example, because projectors may constantly steer, zoom, and/or refocus an image, reducing a weight of the lenses correspondingly reduces an inertia of the lenses and power consumed by the motors. At the same time, the hybrid lens system may correct for chromatic aberration commonly experienced by consumers.

The projector, for example, may include one or more motor(s) that actuate to adjust the projection area, or a normal axis of the projector relative to a wall, projection screen, etc. to correct skewing, keystone effects, etc. For example, the motor(s) may adjust a yaw, pitch, and/or roll of the projector. Adjustment of the yaw, pitch, and/or roll may make the content appear sharper, clearer, etc. In some instances, the motor(s) may be actuated during an initial set up of the projector, or may be continuously actuated throughout projection of the content. Additionally, the projector may also be used in conjunction with projection augmented reality (AR), where the projector overlays digital content onto physical objects or surfaces in the environment. In AR type environments, the projector may be constantly moved, or in motion, to project content on different portions of the wall, for example. Given the movement of the projector and/or components thereof, reducing a weight of the projector or components thereof, such as lenses within the projector, may equate to a reduced amount of power, or driving forces, necessary for the motor(s) to move the projector. As such, reducing a weight of the projector reduces an inertia experienced by the motor(s), gears, etc. within the projector.

The hybrid lens may include any number of lenses, any type of lenses (whether singlet or doublets, etc.), and lenses with different surface finishes. For example, the lenses may include biconvex lenses, plano-convex lenses, positive meniscus lenses, negative meniscus lenses, plano-concave lenses, biconcave lenses, etc. In some instances, the lenses may be capable of zoom. The projector also includes one or more light sources, and a digital light processor (DLP) comprising a digital micromirror device (DMD). Light processed by the DLP may outputs through a light coupling prism.

The hybrid lens system may receive light as outputted from the DLP after passing through the light coupling prism.

The projector may comprise a single DLP or DMD chip with a white light light source and a color wheel, a single DLP or DMD chip with multiple light sources (e.g. one red, one green, and one blue), or may comprise a three-chip projector device with a single light source and three DLP or DMD chips, each being associated with a color (e.g. red, green, blue), and use a prism to split light from the light source, with each color of light being routed to its own DMD chip, then recombined and routed out through one or more lenses.

In some instances, the hybrid lens system includes a doublet lens that may serve as a moving element. In some instances, the doublet lens may move for zoom adjustment to adjust the size of the content within a projection area. Additionally, or alternatively, the doublet lens may move for focusing adjustment (in the case when the hybrid lens system does not have zoom). In some instances, the doublet lens may be the sole lens within the hybrid lens system that is manufactured from glass.

In some instances, at least a portion of the lenses of the hybrid lens system may include aspheric surfaces to correct distortion and create a higher-quality image. The lenses with an aspheric surfaces have a radius of curvature that varies from the center to the edge of the lens. In some instances, the singlet lenses of the hybrid lens system may have aspheric surfaces. In some instances, those singlet lenses that are manufactured from thermoplastics may also have aspheric surfaces.

In some instances, surfaces of the lenses may include both refractive and diffractive elements. In some instances, the surface(s) of the lenses that include both refractive and diffractive elements may have a positive focal length. By forming the lenses out of thermoplastics, the lenses may include a type of hybrid surface that combines a refractive curved profile with a diffractive microstructure for chromatic aberration correction. For example, by both refracting and diffracting light, chromatic aberration may cancel out. In some instances, the lenses may be described with relative to an aperture stop that limits an amount of light through the hybrid lens system. For example, the lens with the refractive curved profile and diffractive microstructure may be oriented towards the aperture stop.

In some instances, the thermoplastic material from which the lenses are manufactured may have a high glass transition temperature. Example thermoplastics include, for example, polystyrene, Polymethyl methacrylate, polyethersulfone, etc. Thermoplastics with high glass transition temperatures may resist degradation from temperatures experienced within the projector, or by the lenses, to increase a quality of the content being projected. The lenses may be manufactured from different or similar thermoplastic materials. The lenses may be manufactured using injection molding (e.g., high-precision injection molding), CNC, diamond milling, etc.

Systems, apparatus, and methods described herein may be utilized with or as part a projector device including a plurality of cameras for adaptable projector display in a room environment.

Such cameras may include a visible-spectrum context camera with a hemispherical (2π steradian) field of view (FOV). The context camera may be used to detect and identify movement paths of users in the room, detect postures (e.g., sitting, standing, facing direction, etc.), and detect gestures (e.g., arm pointing). The context camera may also be used to facilitate determination of acceptable projection surfaces for the steerable projector to project onto. The context camera may further include an infrared (IR) cut filter.

Such cameras may also include a steerable camera that serves to determine focus quality of image projections for system auto focus in a visible light mode. The steerable camera may further map and track user hand gestures for content interaction in an infrared mode. The steerable camera may include both a visible light cut filter and an IR cut filter to enable switching between these modes. The IR mode may work under strong ambient lighting (e.g., sunlight), but for low near-IR light conditions, an additional near-IR irradiation source may be included for hand tracking (e.g., an IR light-emitting diode).

A projector device may also include a direct time of flight (dToF) sensor. The dToF sensor may be used to measure a distance between the apparatus and a projection surface and to determine the angle of incidence of the projection surface relative to a projection axis for calculating correctional warping and/or keystone correction. Keystone correction refers to compensation to avoid the trapezoidal shape caused when the lens is not oriented precisely with respect to a projection surface. The dToF sensor may operate in the 940 nm near-IR band while being insensitive to the 850 nm near-IR band and the visible band.

In various examples, the projector system's auto focus method may leverage both the dToF camera (for fast focus estimation) and the visible mode of the steerable camera (for fine focus adjustment, and to check the dToF camera's estimation quality to account for, e.g., system aging).

In various examples, the projector device may utilize CV to determine locations in an area that are suitable projection surfaces. In accordance with various examples disclosed herein, knowledge of such determined suitable locations may be presumed to exist in memory or other storage. For example, this knowledge may have been programmed ahead of time into the device based on prior input, or determined automatically by another method outside the scope of the present disclosure.

In various examples, the projector device may use CV to determine a position of a user in a room, and the system may subsequently determine an available display location that is preferable (e.g., satisfies certain pre-determined conditions or optimizes a pre-determined function) based on the position of the user (e.g., a candidate display location that is located closest to the determined position of the user).

In various examples, the projector device may use CV to determine a gaze of a user in a room, and the system may subsequently determine an available display location that is preferable (e.g., satisfies certain pre-determined conditions or optimizes a pre-determined function) based on the determined gaze of the user (e.g., a candidate display location that is located closest to a projection of the user's gaze).

In various examples, a user may trigger the system, for example using a voice command to "project over there" while pointing in a direction. The system may use CV to determine a direction the user is pointing, and the system may subsequently determine a display location that is preferable (e.g., satisfies certain pre-determined conditions or optimizes a pre-determined function) based on the determined pointing direction (e.g., a candidate display location that is located closest to a projection of the direction from the user or the user's finger).

In some instances, a projector device comprises a plurality of cameras, one or more projectors, one or more microphones (e.g. a microphone array), one or more speakers, and one or more wireless communication components (e.g. one or more wireless transceivers). In accordance with one or more implementations, a projector device is configured to be mounted to a ceiling and comprises a downward facing 2-pi steradian camera or hemispherical camera. In accordance with one more implementations, a projector device is configured to be positioned on a tabletop or other flat surface and includes a base member comprising a generally flat bottom surface.

Although described in use with a projector, the hybrid lens system may be used within other projection-based systems, devices, etc. Moreover, other devices that include less lenses, such as two, for example, may employ the hybrid lens system with thermoplastic and glass materials.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment including an example projector 100 with an example hybrid lens system 102, according to examples of the present disclosure. As shown, the projector 100 may be mounted to a ceiling 104 within the environment, and orientated towards a wall 106 to output content within a projection area 108. Although the projector 100 is shown being mounted to the ceiling 104, the projector 100 may be mounted elsewhere, such as on a wall, placed on a stand, etc. The projector 100 may include suitable hardware for being mounted within the environment. Additionally, the projector 100 may output the content within the projection area 108 onto a projection screen, directly onto the wall 106, and so forth.

The projector 100 may include one or more motor(s) 110 that actuate to adjust the projection area 108, or a normal axis of the projector 100 relative to the wall 106, to correct skewing, keystone effects, etc. as experienced by a user 112.

For example, the motor(s) 110 may adjust a yaw, pitch, and/or roll of the projector 100. Adjustment of the yaw, pitch, and/or roll may make the content appear sharper, clearer, etc. within the projection area 108. In some instances, the motor(s) 110 may be actuated during an initial set up of the projector 100, or may be continuously actuated through a projection of the content. For example, the projector 100 may also be used in conjunction with projection augmented reality (AR), where the projector 100 overlays digital content onto physical objects or surfaces in the environment for interaction with by the user 112. In AR type environments, the projector 100 may be constantly moved, or in motion, to project content on different portions of the wall 106, for example.

Regardless of the specific implementation, given the movement of the projector 100 and/or components thereof (e.g., lenses), reducing a weight of the projector 100 or components thereof, such as lenses within the projector 100, may equate to a reduced amount of power, or driving forces, necessary for the motor(s) 110 to move the projector 100. Moreover, reducing a weight of the projector 100 reduces an inertia experienced by the motor(s) 110 (or bearings), thereby reducing wear, tear, etc. on components of the projector 100.

The hybrid lens system 102 may be considered "hybrid" in that lenses 114 of the hybrid lens system 102 may be manufactured from different materials. For example, the lenses 114 may be manufactured from glass and thermoplastics. Conventionally, lenses are manufactured from glass, which is heavier compared to thermoplastics. As such, by manufacturing at least some of the lenses 114 of the hybrid lens system 102 from thermoplastics, a weight of the projector 100 may be reduced.

The hybrid lens system 102 may include any number of lenses, any type of lenses (whether singlet or doublets, etc.), and lenses with different surface finishes. For example, the lenses 114 may include biconvex lenses, plano-convex lenses, positive meniscus lenses, negative meniscus lenses, plano-concave lenses, biconcave lenses, etc. In some instances, the lenses 114 may be capable of zoom. As such, the examples lenses 114 in FIG. 1 are exemplary. The projector 100 also includes a digital light processor (DLP) 116 that outputs light through a light coupling prism 118. The hybrid lens system 102 may receive light as outputted from the DLP 116 after passing through the light coupling prism 118. Although described as including a DLP, the projector 100 may include a digital micromirror device (DMD).

In some instances, the hybrid lens system 102 includes a doublet lens 120 that may serve as a moving element of the hybrid lens system 102. For example, the doublet lens may move in a translation direction 122. In some instances, the doublet lens 120 may move for zoom adjustment to adjust the size of the content on the wall 106 (e.g., in the case when the hybrid lens system 102 has zoom). In some instances, the doublet lens 120 may move for focusing adjustment (in the case when the hybrid lens system 102 does not have zoom, such as a prime lens). In some instances, the doublet lens 120 may be the sole lens within the hybrid lens system 102 that is manufactured from glass. For example, if the doublet lens 120 were manufactured from thermoplastic lenses, thermal expansion may be different and potentially cause delamination.

In some instances, at least a portion of the lenses 114 of the hybrid lens system 102 may include aspheric surfaces to correct distortion and create a higher-quality image. The lenses 114 with an aspheric surfaces have a radius of curvature that varies from the center to the edge of the lens. In some instances, the singlet lenses of the hybrid lens system 102 may have aspheric surfaces. In some instances, the singlet lenses that are manufactured from thermoplastics may also have aspheric surfaces.

In some instances, surfaces of the lenses 114 may include both refractive and diffractive elements. Forming the lenses 114 out of thermoplastics, the lenses 114 may include a hybrid surface that combines a refractive curved profile with a diffractive microstructure for chromatic aberration correction. For example, by both refracting and diffracting light, chromatic aberration may cancel out. In some instances, a lens with both refractive and diffractive properties may perform the same function as an anchromatic doublet that brings two wavelengths of light into the same focus. In some instances, manufacturing the lenses 114 out of thermoplastics may permit a surface of the lenses 114 to include both refractive and diffractive elements. In some instances, the lenses 114 may be described in relation to an aperture stop 124 that limits an amount of light through the hybrid lens system 102. For example, the lens with the refractive curved profile and diffractive microstructure may be oriented towards the aperture stop. In some instances, the surface(s) of the lenses that include both refractive and diffractive elements may have a positive focal length.

In some instances, the thermoplastic material from which the lenses are manufactured may have a high glass transition temperature. Example thermoplastics include, for example, polystyrene, Polymethyl methacrylate, polyethersulfone, etc. Thermoplastics with high glass transition temperatures may resist degradation from temperatures experienced within the projector 100, or by the lenses 114, to increase a quality of the content being projected. Between the lenses 114, the lenses 114 may be manufactured from different or similar thermoplastic materials. The lenses 114 may be manufactured from injection molding (e.g., high-precision injection molding), CNC, diamond milling, etc.

Although described in use with a projector, the hybrid lens system 102 may be used within other projection-based systems, devices, etc. Moreover, other devices that include less lenses, such as two, for example, may employ the hybrid lens system 102 with thermoplastic and glass materials.

Figure 2:
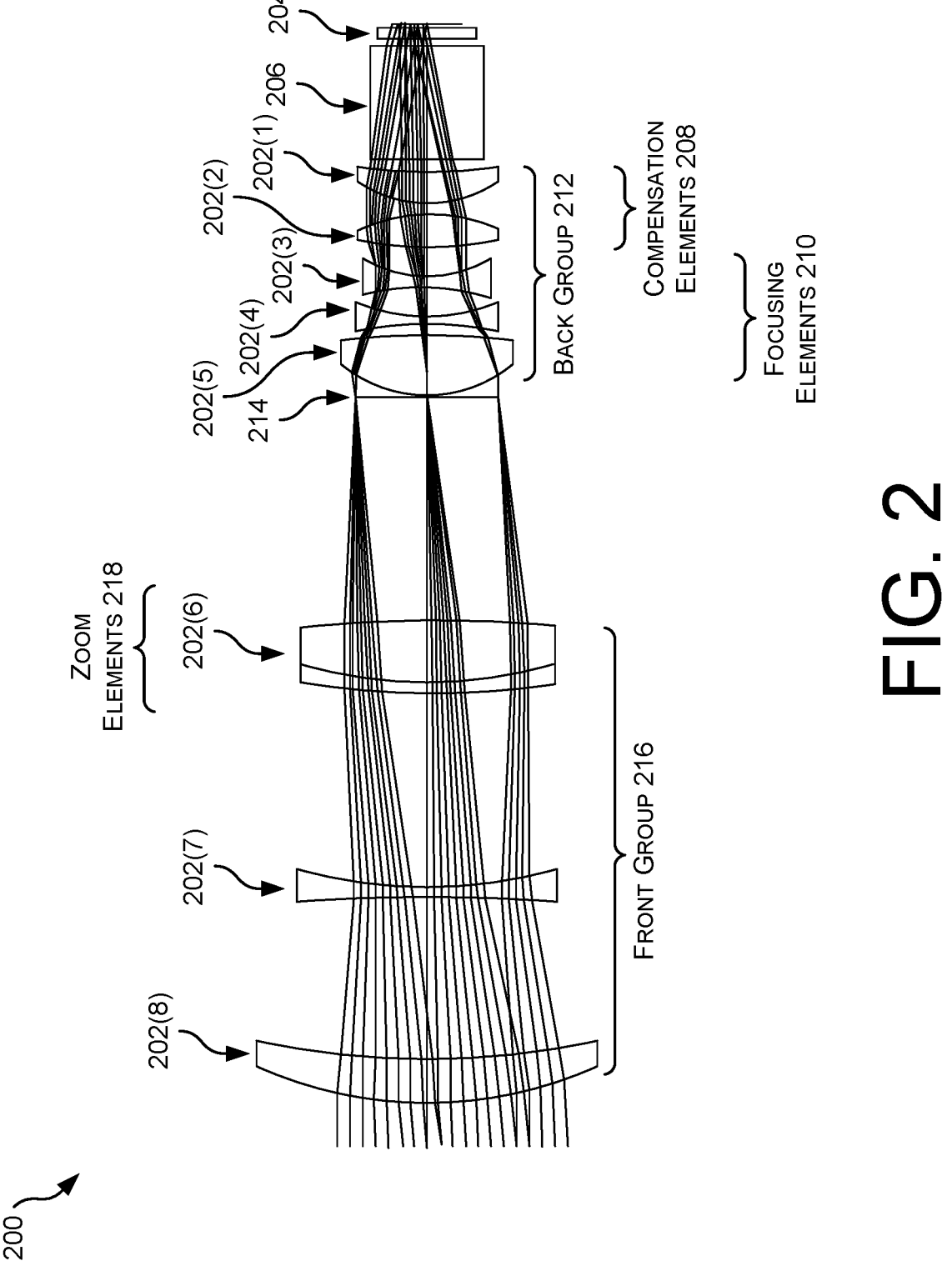
FIG. 2 illustrates example lenses of a hybrid lens system usable within the projector of FIG. 1, according to examples of the present disclosure.

FIG. 2 illustrates an example layout for a hybrid projection zoom lens 200, according to examples of the present disclosure. In some instances, the hybrid projection zoom lens 200 may include eight lens elements 202, such as a first lens element 202(1), a second lens element 202(2), a third lens element 202(3), a fourth lens element 202(4), a fifth lens element 202(5), a sixth lens element 202(6), a seventh lens element 202(7), and an eighth lens element 202(8). The lens elements 202 may receive light generated via a digital light processor (DLP) 204. After passing through a light coupling prism 206, the light may arrive at the first lens element 202(1).

The first lens element 202(1) may be a positive meniscus lens to minimize spherical aberration. The first lens element 202(1) may have a positive focal length. The first lens element 202(1) may include a concave surface disposed adjacent to (e.g., facing, oriented towards, etc.) the light coupling prism 206, and a convex surface disposed adjacent to (e.g., facing, oriented towards) the second lens element 202(2). In some instances, a first surface of the first lens element 202(1) (e.g., the concave surface) may have a greater radius of curvature as compared to a second surface of the first lens element 202(1) (e.g., the convex surface).

The second lens element 202(2) may be a biconvex lens, alternatively referred to as a double convex lens, for magnifying, condensing, or converging the light from the first lens element 202(1). The second lens element 202(2) may also serve to reduce spherical aberration. The second lens element 202(2) may include a first surface disposed adjacent to the first lens element 202(1) and a second surface disposed adjacent to the third lens element 202(3). In some instances, the first surface and the second surface of the second lens element 202(2) have a different radius of curvature. In some instances, the first surface of the second lens element 202(2) may have a smaller radius of curvature as compared to the second surface of the second lens element 202(2).

In some instances, the first lens element 202(1) and the second lens element 202(2) may be compensation elements 208 of the hybrid projection zoom lens 200. For example, the projector 100 may project images onto non-planar and textured surfaces. The compensation elements 208 aim to neutralize geometric and photometric distortions, and/or compensate for zoom.

The third lens element 202(3) may be a biconcave lens, alternatively referred to as a double concave lens, for expanding the light and/or to increase a focal length of the light from the second lens element 202(2). The third lens element 202(3) may include a first surface disposed adjacent to the second lens element 202(2) and a second surface disposed adjacent to the fourth lens element 202(4). In some instances, the first surface and the second surface of the third lens element 202(3) have a different radius of curvature. In some instances, the first surface of the third lens element 202(3) may have a smaller radius of curvature as compared to the second surface of the third lens element 202(3).

The fourth lens element 202(4) may be a biconcave lens for expanding the light and/or to increase a focal length of the light from the third lens element 202(3). The fourth lens element 202(4) may include a first surface disposed adjacent to the third lens element 202(3) and a second surface disposed adjacent to the fifth lens element 202(5). In some instances, the first surface and the second surface of the fourth lens element 202(4) have a different radius of curvature. In some instances, the first surface of the fourth lens element 202(4) may have a smaller radius of curvature as compared to the second surface of the fourth lens element 202(4).

In some instances, the radius of curvature of the first surface of the third lens element 202(3) may be similar as the radius of curvature of the first surface of the fourth lens element 202(4). Additionally, or alternatively, the radius of curvature of the second surface of the third lens element 202(3) may be similar as the radius of curvature of the second surface of the fourth lens element 202(4).

The fifth lens element 202(5) may be a biconvex lens for magnifying, condensing, or converging the light from the fourth lens element 202(4). The fifth lens element 202(5) may also serve to reduce spherical aberration. The fifth lens element 202(5) may include a first surface disposed adjacent to the fourth lens element 202(4) and a second surface disposed adjacent to the sixth lens element 202(6). In some instances, the first surface and the second surface of the second lens element 202(2) have different radius of curvature. In some instances, the first surface of the fifth lens element 202(5) may have a greater radius of curvature as compared to the second surface of the fifth lens element 202(5).

The second surface of the fifth lens element 202(5) may have a refractive and diffractive surface. For example, the second surface of the fifth lens element 202(5) may be a type of hybrid surface that combines a refractive curved profile with a diffractive microstructure for chromatic aberration correction. In some instances, the fifth lens element 202(5) may have a positive focal length.

In some instances, the third lens element 202(3), the fourth lens element 202(4), and the fifth lens element 202(5) may be considered focusing elements 210 of the hybrid projection zoom lens 200 for producing a clear and sharp image. In some instances, the first lens element 202(1), the second lens element 202(2), the third lens element 202(3), the fourth lens element 202(4), and the fifth lens element 202(5) may be driven for adjusting focus.

In some instances, the first lens element 202(1), the second lens element 202(2), the third lens element 202(3), the fourth lens element 202(4), and the fifth lens element 202(5) may be considered a back group 212 of the hybrid projection zoom lens 200. The back group 212 may be symmetric to reduce lateral aberration. For example, the arrangement of the first lens element 202(1) and the second lens element 202(2) on one side of the third lens element 202(3) and the fourth lens element 202(4), and the fifth lens element 202(5) on another side of the third lens element 202(3) and the fourth lens element 202(4), may make the back group 212 symmetrical. In some instances, the double bi-concave lenses (i.e., the third lens element 202(3) and the fourth lens element 202(4)) may correct field curvature and other aberrations.

An aperture stop 214 may be disposed adjacent to the fifth lens element 202(5), between the fifth lens element 202(5) and the sixth lens element 202(6). The second surface of the fifth lens element 202(5) may be disposed immediately adjacent to the aperture stop 214. The aperture stop 214 may limit an amount of the light transmitted from the fifth lens element 202(5) to the sixth lens element 202(6). The aperture stop 214 may be variably controlled to adjust the amount of light through the hybrid projection zoom lens 200.

The sixth lens element 202(6) may be a doublet lens, which may include a biconvex lens and a negative meniscus lens, that receives the light from the fifth lens element 202(5). In some instances, the sixth lens element 202(6) may be considered a cemented doublet. The combination of the biconvex lens and the negative meniscus lens may be used for chromatic aberration correction. The biconvex lens may include a first surface disposed adjacent to the fifth lens element 202(5) and a second surface disposed adjacent (e.g., coupled) to a first surface of the negative meniscus lens. A second surface of the sixth lens element 202(6) may be disposed adjacent to the seventh lens element 202(7).

The sixth lens element 202(6) may serve as zoom elements 218 of the hybrid projection zoom lens 200 that move in the translation direction 122 for zoom adjustment. For example, moving the sixth lens element 202(6) in the translation direction 122 may adjust the size of the image with the need to physically move the projector 100. Although the zoom elements 218 are shown as including a single component (e.g., the sixth lens element 202(6)), the zoom elements 218 may include more than one element or stack of lenses to accomplish zoom. For example, the zoom elements 218 may include a group of lens elements for accomplishing zoom.

In some instances, the first surface and the second surface of the sixth lens element 202(6) have different radius of curvature. In some instances, the first surface of the biconvex lens of the sixth lens element 202(6) may have a greater radius of curvature as compared to the second surface of the biconvex lens of the sixth lens element 202(6). The first surface of the negative meniscus lens of the sixth lens element 202(6) may have the same radius of curvature as compared to the second surface of the biconvex lens of the sixth lens element 202(6). The second surface of the negative meniscus lens of the sixth lens element 202(6) may have a different radius of curvature as compared to the first surface of the negative meniscus lens of the sixth lens element 202(6). In some instances, the second surface of the negative meniscus lens of the sixth lens element 202(6) may have a greater radius of curvature as compared to the first surface of the negative meniscus lens of the sixth lens element 202(6).

The seventh lens element 202(7) may be a biconcave lens for diverging the light or to increase a focal length the light from the sixth lens element 202(6). The seventh lens element 202(7) may have a first surface disposed adjacent to the sixth lens element 202(6) and a second surface disposed adjacent to the eighth lens element 202(8). In some instances, the first surface and the second surface of the seventh lens element 202(7) may have similar or different radius of curvature.

The eighth lens element 202(8) may be a positive meniscus lens to minimize spherical aberration of the light from the seventh lens element 202(7). The eighth lens element 202(8) may include a first surface disposed adjacent to the seventh lens element 202(7) and a second surface opposite the first surface (e.g., disposed adjacent to the environment). In some instances, the first surface and the second surface of the eighth lens element 202(8) have different radius of curvature. In some instances, the first surface of the eighth lens element 202(8) may have a greater radius of curvature as compared to the second surface of the eighth lens element 202(8).

In some instances, the sixth lens element 202(6), the seventh lens element 202(7), and the eighth lens element 202(8) may be considered a front group 216 of the hybrid projection zoom lens 200. The front group 216 may be arranged in front of the aperture stop 214, while the back group 212 may be arranged behind the aperture stop 214. As shown, the front group 216 may have positive lenses on either side of the negative lens. For example, the sixth lens element 202(6) may be a positive lens disposed on a first side of the seventh lens element 202(7), while the eighth lens element 202(8) may be a positive lens disposed on a second side of the seventh lens element 202(7). This arrangement may take advantage of optical symmetry for lateral aberration cancellation.

In some instances, the singlet lenses of the hybrid projection zoom lens 200 may be thermoplastic. For example, the first lens element 202(1), the second lens element 202(2), the third lens element 202(3), the fourth lens element 202(4), the fifth lens element 202(5), the seventh lens element 202(7), and the eighth lens element 202(8) may be manufactured from a thermoplastic material. In comparison, the sixth lens element 202(2) may be manufactured from glass. Thus, the hybrid projection zoom lens 200 may be considered "hybrid" in the sense that the hybrid projection zoom lens 200 has both thermoplastic lens elements and glass lens elements. The use of thermoplastic lenses in the hybrid projection zoom lens 200 may reduce a weight of the projector 100, for example. Reducing the weight in the projector 100 reduces an amount of force necessary for the motor(s) 110 to adjust a yaw, pitch, and/or roll of the projector 100. Additionally, the reduction in weight reducing an amount of force to drive the focusing elements 210.

The singlet lenses of the hybrid projection zoom lens 200 may also include aspheric surfaces. For example, the first lens element 202(1), the second lens element 202(2), the third lens element 202(3), the fourth lens element 202(4), the fifth lens element 202(5), the seventh lens element 202(7), and the eighth lens element 202(8), or the first surface and second surfaces thereof, respectively, may be include an aspheric curvature. The use of aspheric surfaces may correct distortion and create a higher-quality image.

Although certain lens elements 202 are described as being thermoplastic or glass, other combinations are envisioned. For example, some of the lens elements 202 described as being thermoplastic may be manufactured from glass. Additionally, although the hybrid projection zoom lens 200 is described as including certain lens elements 202, or a certain order of the lens elements 202, the hybrid projection zoom lens 200 may include additional or alternative lens elements 202, and/or the lens elements 202 may be rearranged in other orders.

Figure 3:
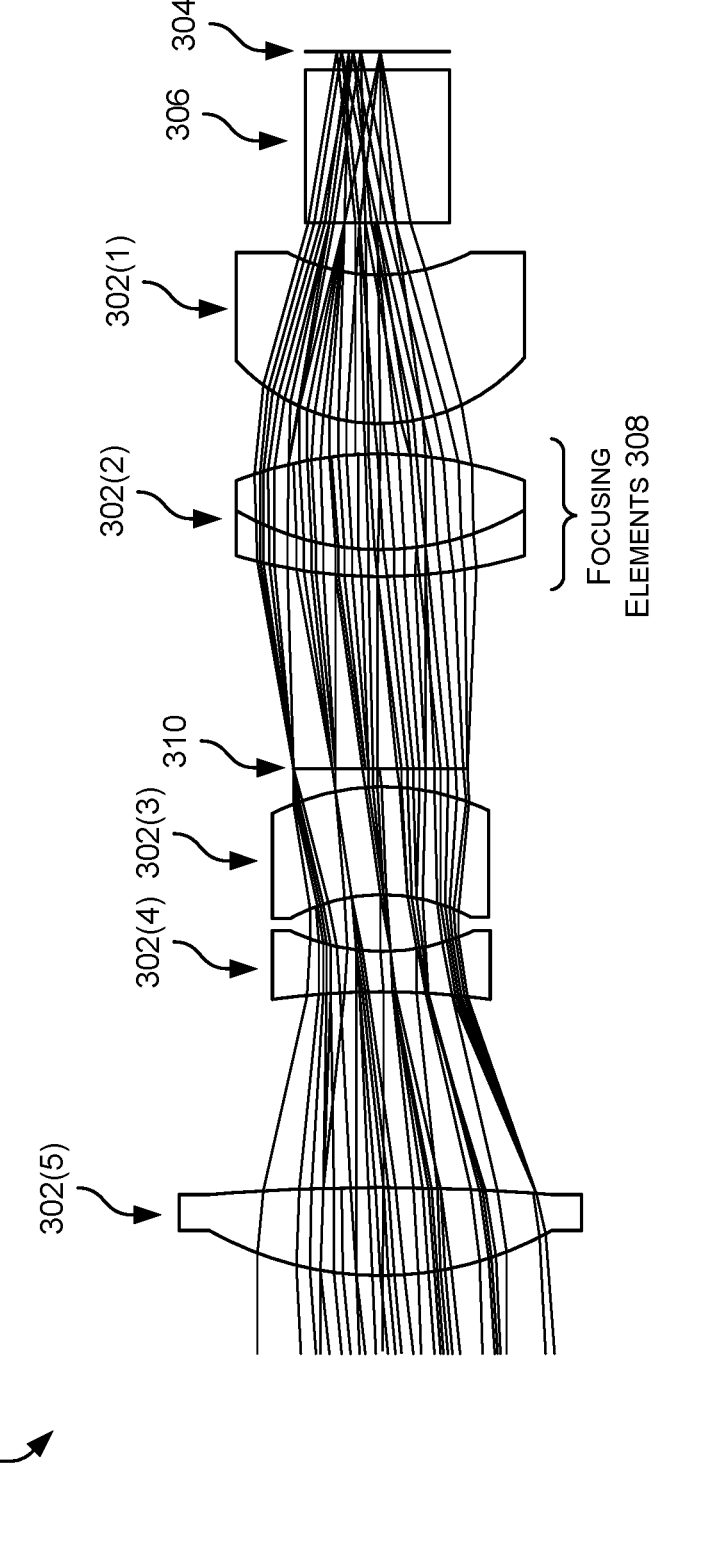
FIG. 3 illustrates example lenses of a hybrid lens system usable within the projector of FIG. 1, according to examples of the present disclosure.

FIG. 3 illustrates an example layout for a hybrid projection lens 300, according to examples of the present disclosure. Compared to the hybrid projection lens 300, the hybrid projection lens 300 may not include zoom components. As such, the hybrid projection lens 300 may be considered a prime lens. In some instances, the hybrid projection lens 300 may include five lens elements 302, such as a first lens element 302(1), a second lens element 302(2), a third lens element 302(3), a fourth lens element 302(4), and a fifth lens element 302(5). The lens elements 302 may receive light generated via a digital light processor (DLP) 304. After passing through a light coupling prism 306, which the light may arrive at the first lens element 302(1).

The first lens element 302(1) may be a convexo-concave lens, which may be alternatively referred to as a positive meniscus lens. The first lens element 302(1) may have a positive focal length and may reduce or eliminate spherical aberration. The first lens element 302(1) may include a concave surface disposed adjacent to (e.g., facing, oriented towards, etc.) the light coupling prism 306, and a convex surface disposed adjacent to (e.g., facing, oriented towards) the second lens element 302(2). In some instances, a first surface (e.g., concave surface) of the first lens element 302(1) may have a smaller radius of curvature as compared to a second surface (e.g., convex surface) of the first lens element 302(1).

The second lens element 302(2) may be a doublet lens, which may include a biconvex lens and a negative meniscus lens, that receives the light from the first lens element 302(1). In some instances, the second lens element 302(2) may be considered a cemented doublet. The combination of the biconvex lens and the negative meniscus lens may be used for chromatic aberration correction. The biconvex lens may include a first surface disposed adjacent to the first lens element 302(1) and a second surface disposed adjacent (e.g., coupled) to a first surface of the negative meniscus lens. A second surface of the second lens element 302(2) may be disposed adjacent to the third lens element 302(3).

In some instances, the first surface and the second surface of the second lens element 302(2) have different radius of curvature. In some instances, the first surface of the biconvex lens of the second lens element 302(2) may have a greater radius of curvature as compared to the second surface of the biconvex lens of the second lens element 302(2). The first surface of the negative meniscus lens of the second lens element 302(2) may have the same radius of curvature as compared to the second surface of the biconvex lens of the second lens element 302(2). The second surface of the negative meniscus lens of the second lens element 302(2) may have a different radius of curvature as compared to the first surface of the negative meniscus lens of the second lens element 302(2). In some instances, the second surface of the negative meniscus lens of the second lens element 302(2) may have a greater radius of curvature as compared to the first surface of the negative meniscus lens of the second lens element 302(2).

The second lens element 302(2) may serve as a moving element in the translation direction 122 for focusing adjustment. For example, the second lens element 302(2) may be considered focusing elements 308 of the hybrid projection lens 300. Although a single lens (e.g., the second lens element 302(2)) is shown as being the focusing elements 308, other lenses may additionally or alternatively be used. For example, any number of lenses may make up the focusing elements 308.

In some instances, the combination of the first lens element 302(1) and the second lens element 302(2) may mitigate spherical aberration and field curvature. An aperture stop 310 may be disposed adjacent to the second lens element 302(2), between the second lens element 302(2) and the third lens element 302(3). The aperture stop 310 may limit an amount of the light transmitted from the second lens element 302(2) to the third lens element 302(3). The aperture stop 310 may be variably controlled to adjust the amount of light.

The third lens element 302(3) may be a positive meniscus lens to reduce or eliminate spherical aberration. The third lens element 302(3) may include a convex surface disposed adjacent to the second lens element 302(2), and a concave surface disposed adjacent to the fourth lens element 302(4). In some instances, the first surface of the third lens element 302(3) may have a greater radius of curvature as compared to the second surface of the third lens element 302(3).

The first surface of the third lens element 302(3) may have a refractive and diffractive surface. For example, the first surface of the third lens element 302(3) may be a type of hybrid surface that combines a refractive curved profile with a diffractive microstructure for chromatic aberration correction. In some instances, the third lens element 302(3) may have a positive focal length.

The fourth lens element 302(4) may be a biconcave lens, alternatively referred to as a double concave lens, for magnifying, condensing, or converging the light from the third lens element 302(3). The fourth lens element 302(4) may also serve to reduce spherical aberration. The fourth lens element 302(4) may include a first surface disposed adjacent to the third lens element 302(3) and a second surface disposed adjacent to the fifth lens element 302(5). In some instances, the first surface and the second surface of the fourth lens element 302(4) have different radius of curvature. In some instances, the first surface of the fourth lens element 302(4) may have a smaller radius of curvature as compared to the second surface of the fourth lens element 302(4).

The fifth lens element 302(5) may be a biconvex lens, alternatively referred to as a double convex lens, for magnifying, condensing, or converging the light from the fourth lens element 302(4). The fifth lens element 302(5) may also serve to reduce spherical aberration. The fifth lens element 302(5) may include a first surface disposed adjacent to the fourth lens element 302(4) a second surface opposite the first surface (e.g., disposed adjacent to the environment). In some instances, the first surface and the second surface of the fifth lens element 302(5) have different radius of curvature. In some instances, the first surface of the fifth lens element 302(5) may have a larger radius of curvature as compared to the second surface of the fifth lens element 302(5).

In some instances, the third lens element 302(3), the fourth lens element 302(4), and the fifth lens element 302(5)

may resemble a Cooke triplet, with two positive lenses surrounding a biconcave negative lens in the middle. By resembling a Cooke triplet, the third lens element 302(3), the fourth lens element 302(4), and the fifth lens element 302(5) may correct the five Seidel aberrations-spherical, coma, astigmatism aberration, filed/Petzval curvature, and distortion. This design may also take advantage of the optical symmetry for lateral aberration cancellation.

In some instances, the singlet lenses of the hybrid projection lens 300 may be thermoplastic. For example, the first lens element 302(1), the third lens element 302(3), the fourth lens element 302(4), and the fifth lens element 302(5) may be manufactured from a thermoplastic material. In comparison, the second lens element 302(2) may be manufactured from glass. Thus, the hybrid projection lens 300 may be considered "hybrid" in the sense that the hybrid projection lens 300 has both thermoplastic lens elements and glass lens elements. The use of thermoplastic lenses in the hybrid projection lens 300 may reduce a weight of the projector 100. Reducing the weight in the projector 100 reduces an amount of force necessary for the motor(s) 110 to adjust a yaw, pitch, and/or roll of the projector 100. Additionally, the reduction in weight reducing an amount of force to drive the focusing elements.

The singlet lenses of the hybrid projection lens 300 may also include aspheric surfaces. For example, the first lens element 302(1), the third lens element 302(3), the fourth lens element 302(4), and the fifth lens element 302(5), or the first surface and second surfaces thereof, respectively, may be include a aspheric curvatures. The use of aspheric surfaces may correct distortion and create a higher-quality image.

In some instances, the hybrid projection lens 300 may have a telecentric chief ray angle on the DLP 304 to increase uniformity. To achieve a telecentric chief ray angle, the chief rays that pass through the aperture stop 310 are parallel to the optical axis the hybrid projection lens. By being telecentric, the hybrid projection lens 300 may have a constant magnification, meaning that a size of the image being projection does not change with the position of the projector 100.

Figure 4:
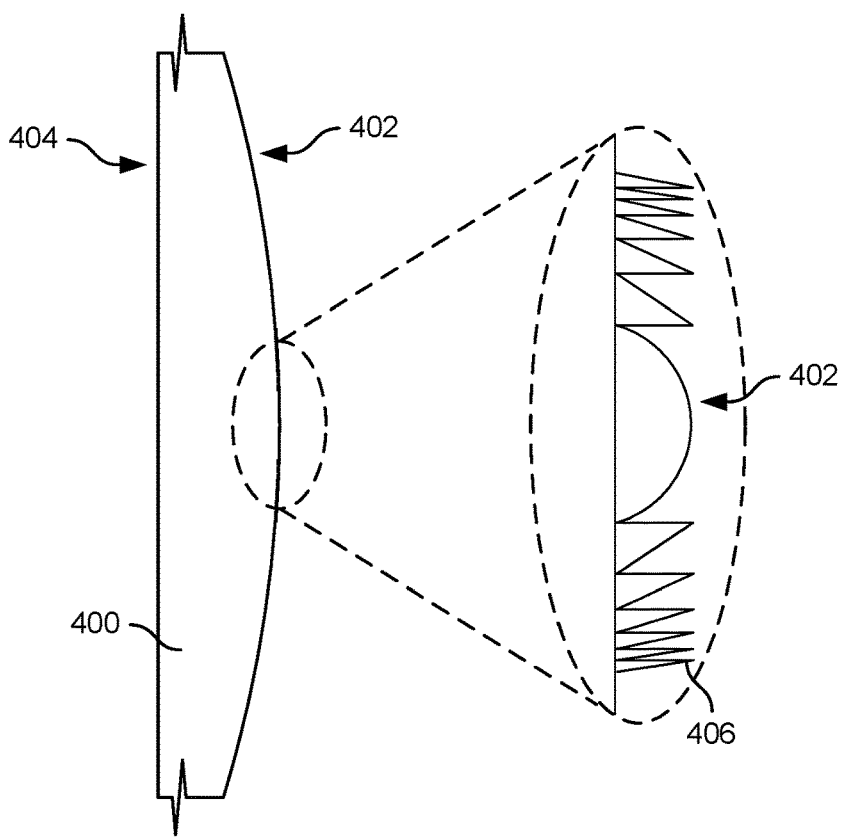
FIG. 4 illustrates a lens with refractive and diffractive characteristics, according to examples of the present disclosure.

FIG. 4 illustrates an example lens 400, according to examples of the present disclosure. In some instances, the lens 400 may represent a lens with refractive and diffractive characteristics. For example, the lens 400 may be representative of the fifth lens element 200(2) or the third lens element 300(3). The shape, size, types, curvatures, etc. of the lens 400 is exemplary, and other shapes, sizes, types, curvatures, etc. of lenses are envisioned. In some instances, the lens 400 may have a positive focal length to converge light.

The lens 400 may include a first surface 402 and a second surface 404, opposite the first surface 402. The first surface 402 may be disposed immediately disposed adjacent to, and/or face, the aperture stop 214 and/or the aperture stop 310. The first surface 402 may include refractive and diffractive characteristics. For example, the first surface 402 be refractive and diffractive to light. In some instances, the diffraction may be caused by surface features 406 formed in, on, or by the first surface 402. In some instances, the surface features 406 may be representative of features on a kinoform lens or a Fresnel lens.

Figure 5:
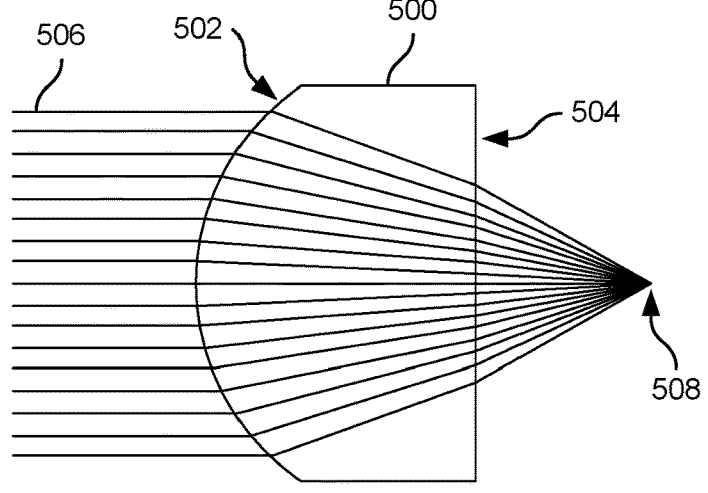
FIG. 5 illustrates an example lens with aspheric features, according to examples of the present disclosure.

FIG. 5 illustrates an example lens 500, according to examples of the present disclosure. In some instances, the lens 500 may represent a lens with an aspheric surface, and may be representative of the aspheric surfaces, or aspheric lenses, described hereinabove. The shape, size, curvatures, etc. of the lens 500 is exemplary, and other shapes, sizes, curvatures, etc. of lenses are envisioned.

The lens 500 may include a first surface 502 and a second surface 504, opposite the first surface 502. The first surface 502 may an aspheric surface, where the first surface 502 may include a shape that is non-spherical and non-cylindrical. With the aspheric surface, the lens 500 may correct spherical aberration of light 506. Moreover, with the aspheric surface, the lens 500 may focus the light 506 to a single point 508, regardless of where the light enters the first surface 502. This may reduce, or eliminate, perceive blurriness.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A projector device comprising:
a camera;
a time of flight sensor;
a light source;
a digital light processor (DLP) including a digital micromirror device (DMD);
a light coupling prism disposed adjacent to the DLP;
a first lens disposed adjacent to the light coupling prism;
a second lens disposed adjacent to the first lens;
an aperture stop;
a third lens disposed adjacent to a first side of the aperture stop, the third lens including:
a first surface oriented towards the aperture stop, the first surface being both refractive and diffractive to light; and
a second surface towards the second lens;
a fourth lens disposed adjacent to a second side of the aperture stop, the fourth lens being manufactured from a first material; and
a fifth lens disposed adjacent to the fourth lens, the fifth lens being manufactured from a second material that is different than the first material.

2. The projector device of claim 1, wherein:
the first material comprises a thermoplastic; and
the second material comprises glass.

3. The projector device of claim 1, wherein the fourth lens comprises a doublet lens that is translatable to adjust a zoom associated with the projector device.

4. The projector device of claim 1, further comprising:
a sixth lens disposed between the second lens and the third lens;
a seventh lens disposed between the sixth lens and the third lens; and
an eighth lens disposed between the fourth lens and the fifth lens.

5. The projector device of claim 4, wherein:
the first lens, the second lens, the third lens, the sixth lens, the seventh lens, and the eighth lens are manufactured from a thermoplastic; and
the fifth lens is manufactured from glass.

6. The projector device of claim 5, wherein at least one of the first lens, the second lens, the third lens, the sixth lens, the seventh lens, or the eighth lens includes an aspheric surface.

7. A projector device comprising:
a camera;
a light source;
a digital micromirror device; and
a lens system positioned and arranged to receive light from the light source via the digital micromirror device, the lens system including:
an aperture stop,
a first lens disposed on a first side of the aperture stop, the first lens being manufactured from glass,
a second lens disposed on the first side of the aperture stop, the second lens being manufactured from thermoplastic,
a third lens disposed on a second side of the aperture stop, the third lens being manufactured from thermoplastic, and
a fourth lens being manufactured from thermoplastic, the fourth lens having:
a first surface oriented towards the aperture stop, the first surface being refractive and diffractive to light passing through the lens system, and
a second surface oriented away from the aperture stop.

8. The projector device of claim 7, wherein the fourth lens is disposed on the first side of the aperture stop.

9. The projector device of claim 7, wherein:
the second lens, the third lens, and the fourth lens are singlet lenses; and
the first lens is a doublet lens.

10. The projector device of claim 9, wherein at least one of the second lens, the third lens, or the fourth lens includes an aspheric surface.

11. The projector device of claim 7, further comprising a fifth lens disposed on the second side of the aperture stop, the fifth lens being manufactured from thermoplastic, wherein:
the fourth lens is disposed on the second side of the aperture stop; and
the fifth lens is disposed between the fourth lens and the third lens.

12. The projector device of claim 11, wherein:
the first lens comprises a doublet lens including a biconvex lens and a negative meniscus lens;
the second lens comprises a positive meniscus lens;
the third lens comprises a biconvex lens;
the fourth lens comprises a positive meniscus lens; and
the fifth lens comprises a biconcave lens.

13. The projector device of claim 7, wherein the fourth lens is disposed on the second side of the aperture stop, further comprising at least one of:
a fifth lens disposed on the first side of the aperture stop, the fifth lens being manufactured from thermoplastic;
a sixth lens disposed on the second side of the aperture stop, the sixth lens being manufactured from thermoplastic;
a seventh lens disposed on the second side of the aperture stop, the seventh lens being manufactured from thermoplastic; and
an eighth lens disposed on the second side of the aperture stop, the eighth lens being manufactured from thermoplastic.

14. The projector device of claim 13, wherein:
the fourth lens, the third lens, and the sixth lens are focusing elements of the projector device; and
the seventh lens and the eighth lens are zoom compensating elements of the projector device.

15. The projector device of claim 13, wherein:
the first lens comprises biconvex lens and a negative meniscus lens;

the second lens comprises a biconcave lens;
the third lens comprises a biconcave lens;
the fourth lens comprises a biconvex lens;
the fifth lens comprises a positive meniscus lens;
the sixth lens comprises a biconcave lens;
the seventh lens comprises a biconvex lens; and
the eighth lens comprises a positive meniscus lens.

16. A projector device comprising:
a light source;
a digital micromirror device;
a lens system positioned and arranged to receive light
    from the light source via the digital micromirror device,
    the lens system including:
    an aperture stop,
    a first lens manufactured from a first material and being
        disposed on a first side of the aperture stop, and
    a second lens manufactured from a second material and
        being disposed on a second side of the aperture stop
        that is opposite the first side of the aperture stop, the
        second lens having:
        a first surface oriented towards the aperture stop, the
            first surface being both refractive and diffractive to light passing through the second lens, where fea-
            tures formed within the first surface contribute to
            light diffraction, and
        a second surface opposite the first surface.
17. The projector device of claim 16, wherein:
the first material comprises glass; and
the second lens comprises thermoplastic.
18. The projector device of claim 16, wherein the second
lens comprises a positive meniscus lens or a biconvex lens.
19. The projector device of claim 16, further comprising
at least one of:
    one or more third lenses disposed on the first side of the
        aperture stop, the one or more third lenses being
        manufactured from the second material; or
    one or more fourth lenses disposed on the second side of
        the aperture stop, the one or more fourth lenses being
        manufactured from the second material.
20. The projector device of claim 19, wherein at least one
of the second lens, the one or more third lenses, or the one
or more fourth lenses includes an aspheric surface.

\* \* \* \* \*